US012683349B2

(12) United States Patent     (10) Patent No.: US 12,683,349 B2

Takasaka et al.     (45) Date of Patent: Jul. 14, 2026

(54) OPTICAL AMPLIFYING FIBER, OPTICAL FIBER AMPLIFIER, AND OPTICAL COMMUNICATION SYSTEM

(71) Applicant: FURUKAWA ELECTRIC CO., LTD., Tokyo (JP)

(72) Inventors: Shigehiro Takasaka, Tokyo (JP); Koichi Maeda, Tokyo (JP); Keiichi Aiso, Tokyo (JP); Shinichi Arai, Tokyo (JP); Kazunori Mukasa, Tokyo (JP); Yukihiro Tsuchida, Tokyo (JP); Masanori Takahashi, Tokyo (JP); Ryuichi Sugizaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 746 days.

(21) Appl. No.: 18/068,039

(22) Filed: Dec. 19, 2022

(65) Prior Publication Data

US 2023/0123319 A1     Apr. 20, 2023

Related U.S. Application Data

(63) Continuation of application No. PCT/JP2021/029581, filed on Aug. 10, 2021.

(30) Foreign Application Priority Data

Aug. 17, 2020    (JP) ................................. 2020-137387

(51) Int. Cl.
   *H01S 3/067*       (2006.01)
   *H01S 3/094*       (2006.01)
(52) U.S. Cl.
   CPC ...... *H01S 3/06733* (2013.01); *H01S 3/06737* (2013.01); *H01S 3/094007* (2013.01)

(58) Field of Classification Search
   CPC ............. H01S 3/06733; H01S 3/06737; H01S 3/094007; G02B 6/02042; G02B 6/02395
   See application file for complete search history.

(56) References Cited

U.S. PATENT DOCUMENTS 6,278,816 B1   8/2001   Keur et al.
6,411,762 B1   6/2002   Anthon et al.
(Continued)

FOREIGN PATENT DOCUMENTS

JP       11-52162 A     2/1999
JP    2005-250022 A    9/2005
(Continued)

OTHER PUBLICATIONS

Japanese Notice of Reasons for Refusal issued Aug. 26, 2025 in Japanese Patent Application No. 2022-543898 with English Machine translation, 20 pgs.

(Continued)

*Primary Examiner* — Dennis P Joseph
(74) *Attorney, Agent, or Firm* — Oblon, McClelland, Maier & Neustadt, L.L.P.

(57) ABSTRACT

An optical amplifying fiber includes: at least one core portion including a rare earth element added therein; an inner cladding portion surrounding the at least one core portion, the inner cladding portion having a refractive index lower than a maximum refractive index of the at least one core portion; and an outer cladding portion surrounding the inner cladding portion, the outer cladding portion having a refractive index lower than the refractive index of the inner cladding portion, the inner cladding portion including different refractive index regions each having a refractive index different from a refractive index of a region adjacent to that different refractive index region.

19 Claims, 7 Drawing Sheets

(56)          References Cited

U.S. PATENT DOCUMENTS

| | | | |
|---|---|---|---|
| 2007/0160091 A1 | 7/2007 | Lee et al. | |
| 2010/0067860 A1 | 3/2010 | Ikeda et al. | |
| 2010/0195194 A1* | 8/2010 | Chen ................. | G02B 6/03644 |
| | | | 385/127 |
| 2010/0296157 A1 | 11/2010 | Takahashi | |
| 2013/0336343 A1 | 12/2013 | Miyabe et al. | |
| 2015/0180195 A1 | 6/2015 | Takahashi | |
| 2016/0245989 A1 | 8/2016 | Suzuki et al. | |
| 2018/0356590 A1* | 12/2018 | Amma ................... | G02B 6/036 |

FOREIGN PATENT DOCUMENTS

| | | | |
|---|---|---|---|
| JP | 2007-189190 A | 7/2007 | |
| JP | 2010-534354 A | 11/2010 | |
| JP | 2010-272827 A | 12/2010 | |
| JP | 2011-164408 A | 8/2011 | |
| JP | 2017-503189 A | 1/2017 | |
| JP | 2017-34064 A | 2/2017 | |
| JP | 2017-183564 A | 10/2017 | |
| JP | 2021-163833 A | 10/2021 | |
| WO | WO 2008/133242 A1 | 11/2008 | |
| WO | WO 2012/172996 A1 | 12/2012 | |
| WO | WO 2013/038794 A1 | 3/2013 | |
| WO | WO 2018/138982 A1 | 8/2018 | |

OTHER PUBLICATIONS

International Search Report issued Nov. 02, 2021 in PCT/JP2021/029581 filed on Aug. 10, 2021, 3 pages.

Abedin, Kazi S. et al, Multimode Erbium Doped Fiber Amplifiers for Space Division Multiplexing Systems, Journal of Lightwave Technology, vol. 32, No. 16, Aug. 15, 2014, 9 pages.

Abedin, Kazi S. et al., "Cladding-pumped erbium-doped multicore fiber amplifier", Optics Express, vol. 20, No. 18, Aug. 2012, 10 pages.

* cited by examiner

FIG.11

OPTICAL AMPLIFYING FIBER, OPTICAL FIBER AMPLIFIER, AND OPTICAL COMMUNICATION SYSTEM

CROSS-REFERENCE TO RELATED APPLICATION(S)

This application is a continuation of International Application No. PCT/JP2021/029581, filed on Aug. 10, 2021 which claims the benefit of priority of the prior Japanese Patent Application No. 2020-137387, filed on Aug. 17, 2020, the entire contents of which are incorporated herein by reference.

BACKGROUND

1. Technical Field

The present disclosure relates to optical amplifying fibers, optical fiber amplifiers, and optical communication systems.

2. Related Art

Using multi-core erbium-doped optical fiber amplifiers (EDFAs) as optical amplifiers for uses in, for example, submarine optical communication, is hoped to reduce power consumption of the optical amplifiers.

In a known configuration related to multi-core EDFAs, a multi-core optical amplifying fiber that is a double-cladding multi-core EDF is used and erbium (Er), a rare earth element, included in its core portions is optically pumped by the cladding pumping scheme (see Kazi S. Abedin et al., "Multimode Erbium Doped Fiber Amplifiers for Space Division Multiplexing Systems", JOURNAL OF LIGHTWAVE TECHNOLOGY, VOL. 32, NO. 16, Aug. 15, 2014, pp. 2800 to 2808; and Kazi S. Abedin et al., "Cladding-pumped erbium-doped multicore fiber amplifier", OPTICS EXPRESS, Vol. 20, No. 18, 27 Aug. 2012, pp. 20191 to 20200).

Because communication traffic is increasing evermore, there is a demand for even better characteristics of multi-core optical amplifying fibers, for larger communication capacity.

In particular, in terms of reduction in power consumption of multi-core optical fiber amplifiers, pumping efficiency of multi-core optical amplifying fibers is preferably improved. Pumping efficiency is expressed by a ratio of energy of pumping light used in optical amplification to energy of pumping light input to a multi-core optical amplifying fiber. Improving the pumping efficiency is also beneficial, not only for multi-core optical amplifying fibers but also for single-core optical amplifying fibers.

SUMMARY

It is an object of the disclosure to at least partially solve the problems in the conventional technology.

In some embodiments, an optical amplifying fiber includes: at least one core portion including a rare earth element added therein; an inner cladding portion surrounding the at least one core portion, the inner cladding portion having a refractive index lower than a maximum refractive index of the at least one core portion; and an outer cladding portion surrounding the inner cladding portion, the outer cladding portion having a refractive index lower than the refractive index of the inner cladding portion, the inner cladding portion including different refractive index regions each having a refractive index different from a refractive index of a region adjacent to that different refractive index region.

In some embodiments, an optical fiber amplifier includes: the optical amplifying fiber; a pumping light source configured to output pumping light that optically pumps the rare earth element in the optical amplifying fiber; and an optical coupler configured to optically couple the pumping light to the inner cladding portion of the optical amplifying fiber.

In some embodiments, an optical communication system includes: the optical fiber amplifier.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 11 is a schematic diagram of a configuration of a multi-core optical fiber amplifier according to an eighth embodiment;

DETAILED DESCRIPTION

Embodiments will be described hereinafter by reference to the drawings. The disclosure is not limited by these embodiments. The same reference sign will be assigned to elements that are the same or corresponding to each other, as appropriate, throughout the drawings. It also needs to be noted that the drawings are schematic, and relations among dimensions of each element and ratios among different elements, for example, may be different from the actual ones. A portion having different dimensional relations and ratios among the drawings may also be included.

Furthermore, in this specification, a cutoff wavelength means a cable cutoff wavelength defined by ITU-T (International Telecommunication Union) G.650.1. In addition, any other term not particularly defined in this specification conforms to the definition or measurement method according to G.650.1 and G.650.2.

First Embodiment

Figure 1:
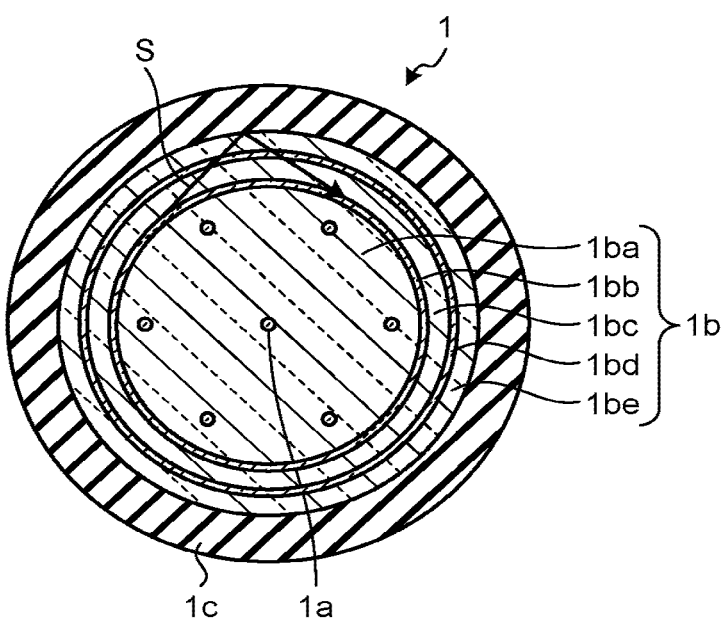
FIG. 1 is a schematic sectional view of a multi-core optical amplifying fiber according to a first embodiment.

FIG. 1 is a schematic sectional view of a multi-core optical amplifying fiber according to a first embodiment and illustrates a cross section of the multi-core optical amplifying fiber, the cross section being orthogonal to an axial direction of the multi-core optical amplifying fiber. A multi-core optical amplifying fiber 1 is a double-cladding and seven-core multi-core optical fiber including plural core portions that are seven core portions 1a, an inner cladding portion 1b surrounding the core portions 1a, and an outer cladding portion 1c surrounding the inner cladding portion 1b.

The core portions 1a have a triangular lattice arrangement in a close-packed state. That is, one of the core portions 1a is arranged at or near the center of the inner cladding portion 1b. Around this core portion 1a, six of the core portions 1a are positioned at vertices of a regular hexagon. In other words, the core portions 1a are positioned at lattice points of a hexagonal close-packed lattice prescribed in a cross section of the multi-core optical amplifying fiber 1, the cross section being orthogonal to an axial direction of the multi-core optical amplifying fiber 1. The core portions 1a include a refractive index adjusting dopant that increases their refractive indices, for example, germanium (Ge) and/or aluminum (Al). The core portions 1a also include erbium (Er) as a rare earth element that is an amplifying medium. Er is added, for example, at a concentration where the peak of the absorption coefficient near a wavelength of 1530 nm has a value of 2.5 dB/m to 11 dB/m. For example, Er is added at a concentration of, for example, 250 ppm to 2000 ppm. However, the absorption coefficient and the added concentration are not particularly limited. Al also has a function of reducing concentration quenching of Er.

The inner cladding portion 1b has a refractive index lower than the maximum refractive index of the core portions 1a. A refractive index profile of the core portions 1a and the inner cladding portion 1b is, for example, a step-index profile. The inner cladding portion 1b may have trench portions positioned respectively around the core portions 1a. In this case, the trench portions are made of quartz glass having, added therein, a refractive index adjusting dopant that lowers their refractive indices, and the trench portions thus have refractive indices lower than the refractive index of the other part of the inner cladding portion 1b. In this case, the refractive index profile of the core portions 1a and the inner cladding portion 1b is a trench profile.

The inner cladding portion 1b includes an inner region 1ba having a circular cross section and surrounding the core portions 1a, a different refractive index region 1bb surrounding the inner region 1ba and being annular and layered, a different refractive index region 1bc surrounding the different refractive index region 1bb and being annular and layered, a different refractive index region 1bd surrounding the different refractive index region 1bc and being annular and layered, and a different refractive index region 1be surrounding the different refractive index region 1bd and being annular and layered. The different refractive index regions 1bb, 1bc, 1bd, and 1be are regions each having a refractive index different from those of regions adjacent thereto. Specifically, the different refractive index region 1bb has a refractive index different from those of the inner region 1ba and different refractive index region 1bc that are regions adjacent to the different refractive index region 1bb. The different refractive index region 1bc has a refractive index different from those of the different refractive index region 1bb and different refractive index region 1bd that are regions adjacent to the different refractive index region 1bc. The different refractive index region 1bd has a refractive index different from those of the different refractive index region 1bc and different refractive index region 1be that are regions adjacent to the different refractive index region 1bd.

The inner region 1ba is made of, for example, pure quartz glass not including any dopant for refractive index adjustment, and the different refractive index regions 1bb, 1bc, 1bd, and 1be are each made of, for example, quartz glass including a dopant for refractive index adjustment. Examples of the dopant for refractive index adjustment include fluorine (F), Ge, phosphorus (P), boron (B), an alkali metal, such as sodium (Na) or potassium (K), chlorine (Cl), and aluminum (Al). One or more dopants selected from these dopants is/are added to the different refractive index regions 1bb, 1bc, 1bd, and 1be. Changing the types and amounts of the dopants added enables the different refractive index regions 1bb, 1bc, 1bd, and 1be to have refractive indices different from each other. As to the refractive index difference between adjacent ones of the inner region 1ba and different refractive index regions 1bb, 1bc, 1bd, and 1be, the larger the absolute value of the relative refractive index difference of one from the other, the more preferable. For example, this absolute value is 0.3% or more and more preferably 0.7% or more. Furthermore, layer thicknesses of the different refractive index regions 1bb, 1bc, 1bd, and 1be are each preferably at least about several times the wavelength of light propagated, to achieve refractive index differences with an average value of wavelength order. The inner cladding portion 1b preferably has a layer thickness of at least 1 μm or larger because pumping light having a wavelength enabling optical pumping of Er, for example, pumping light of a 900 nm wavelength band, such as pumping light having a wavelength of 976 nm, is to be propagated therethrough, as described later. The layer thickness may be set as appropriate according to the outer diameter of the inner cladding portion 1b.

Having the different refractive index regions 1bb, 1bc, 1bd, and 1be in the inner cladding portion 1b of the multi-core optical amplifying fiber 1 means that two or more different refractive index region layers that are four different refractive index region layers are present in a radial direction of the multi-core optical amplifying fiber 1.

When a relative refractive-index difference of each of the core portions 1a from the glass of the inner region 1ba is defined as a core Δ, in this embodiment, the cores Δ of the core portions 1a are approximately equal to one another and is, for example, 0.35% to 2% at a wavelength of 1550 nm. In relation to the cores Δ, core diameters of the core portions 1a are each preferably set to achieve a cutoff wavelength shorter than an optical amplification wavelength band where rare earth elements enable optical amplification. The optical amplification wavelength band for Er is, for example, a band of 1530 nm to 1565 nm called the C band, or for example, a band of 1565 nm to 1625 nm called the L band. The core diameters are, for example, about 5 μm to about 10 μm.

The outer cladding portion 1c has a refractive index lower than the refractive index of the inner cladding portion 1b, and is made of, for example, resin. In a case where the inner cladding portion 1b has trench portions for the core portions 1a, the refractive index of the outer cladding portion 1c may be higher than the refractive indices of the trench portions but is lower than the refractive index of the other part of the inner cladding portion 1*b* and the average refractive index of the inner cladding portion 1*b*.

When pumping light having a wavelength enabling optical pumping of Er, for example, pumping light having a wavelength in the 900 nm wavelength band, such as 976 nm, is input to the inner cladding portion 1*b*, the pumping light optically pumps Er that has been added in the core portions 1*a* while propagating through the inner cladding portion 1*b*. The core portions 1*a* are thereby able to optically amplify signal light input to the core portions 1*a*. The multi-core optical amplifying fiber 1 is thus configured so that the cladding pumping scheme is applicable to the multi-core optical amplifying fiber 1.

Interfaces (which may hereinafter be referred to as different refractive index interfaces) between adjacent ones of the inner region 1*ba* and different refractive index regions 1*bb*, 1*bc*, 1*bd*, and 1*be* of the multi-core optical amplifying fiber 1 scatter pumping light propagating through the inner cladding portion 1*b*, the adjacent ones having refractive indices different from each other. As a result, components that reach the core portions 1*a* are increased, the components being of the pumping light propagating through the inner cladding portion 1*b*. For example, in the cladding pumping scheme as adopted in the multi-core optical amplifying fiber 1, there is normally an unused component that is propagated without reaching the core portions 1*a* and that does not contribute to pumping, like a skew component S. However, the unused component, such as the skew component S, is scattered by the different refractive index interfaces in the multi-core optical amplifying fiber 1, part of the scattered unused component reaches the core portions 1*a*, and can be used in optical pumping of Er. Because the pumping light propagates through the inner cladding portion 1*b* in a multi-mode manner, the skew component S can also propagate in different modes at various angles. Scatter of these various skew components S by the different refractive index interfaces causes part of the scattered skew components S to reach the core portions 1*a* and become more likely to be used in optical pumping of Er.

Because components reaching the core portions 1*a* of the multi-core optical amplifying fiber 1 configured as described above are increased through scatter of the pumping light by the different refractive index interfaces, the components being of pumping light propagating through the inner cladding portion 1*b*, the multi-core optical amplifying fiber 1 has improved pumping efficiency. Furthermore, adjusting the number and thicknesses of the layers of the different refractive index regions in the radial direction and adjusting the refractive index differences enable adjustment of the effects of the different refractive index interfaces. For example, the multi-core optical amplifying fiber 1 may be designed as appropriate so that the multi-core optical amplifying fiber 1 has one or more of each of the layers of the different refractive index regions and the total number of the layers of the different refractive index regions is two or more.

The multi-core optical amplifying fiber 1 is able to be manufactured by use of a known method of manufacturing a multi-core fiber, for example, the stacking method or the drilling method. For example, in a case where the drilling method is used: seven holes extending parallel to the axial direction are formed in a preform rod; core rods that are glass rods are inserted in these holes, the glass rods each including a portion that becomes the core portion 1*a* and a portion that becomes part of the inner region 1*ba*; and a preform is thereby formed. Subsequently, this preform is drawn and the outer cladding portion 1*c* is then formed.

The preform rod used in the above described method may be manufactured by use of, for example, the vapor-phase axial deposition (VAD) method, the outside vapor deposition (OVD) method, the modified chemical vapor deposition (MCVD) method, or the plasma CVD method. In this manufacture, a soot layer that becomes the inner region 1*ba*, a soot layer that becomes the different refractive index region 1*bb*, a soot layer that becomes the different refractive index region 1*bc*, a soot layer that becomes the different refractive index region 1*bd*, and a soot layer that becomes the different refractive index region 1*be* are deposited as soot layers formed of glass particles, and the soot layers are dehydrated and vitrified by heat treatment and thereby formed into the preform rod.

The preform rod used in the above described method may also be manufactured by the jacket method. In this case, jacket tubes that respectively become the different refractive index regions 1*bb*, 1*bc*, 1*bd*, and 1*be* are inserted over one another in a glass rod that becomes the inner region 1*ba*, and are integrated by heat treatment to be formed into the preform rod.

Second Embodiment

Figure 2:
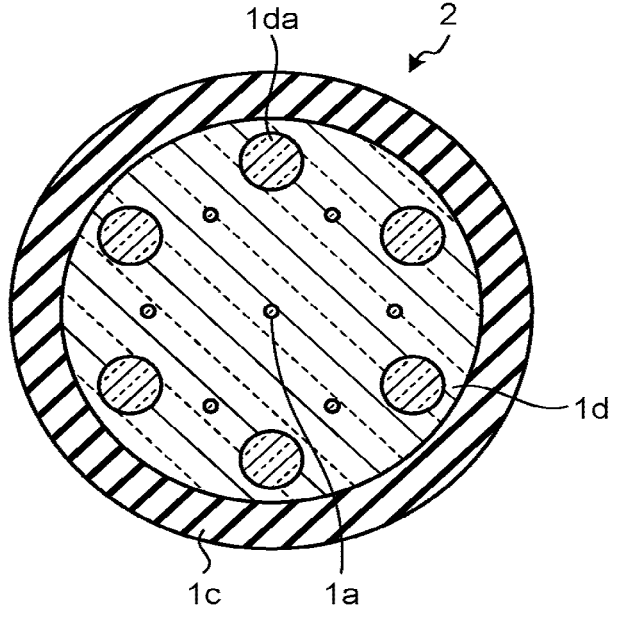
FIG. 2 is a schematic sectional view of a multi-core optical amplifying fiber according to a second embodiment.

FIG. 2 is a schematic sectional view of a multi-core optical amplifying fiber according to a second embodiment. This multi-core optical amplifying fiber 2 has a configuration having an inner cladding portion 1*d* instead of the inner cladding portion 1*b*, in the multi-core optical amplifying fiber according to the first embodiment illustrated in FIG. 1. The inner cladding portion 1*d* has a configuration having: a region instead of the different refractive index regions 1*bb*, 1*bc*, 1*bd*, and 1*be* of the inner cladding portion 1*b*, the region being made of the same material as the inner region 1*ba*; and plural different refractive index regions 1*da* each having a circular cross section. In this second embodiment, the number of the different refractive index regions 1*da* is six but the number is not particularly limited.

The different refractive index regions 1*da* each have a refractive index different from that of a region adjacent to that different refractive index region 1*da* in the inner cladding portion 1*d*. Furthermore, the different refractive index regions 1*da* are positioned outside the regular hexagon formed by the core portions 1*a*. In addition, the different refractive index regions 1*da* are positioned to be rotationally symmetric about an axis at the center of the multi-core optical amplifying fiber 2 and in this second embodiment, are at six-fold rotationally symmetric positions. Furthermore, the different refractive index regions 1*da* are positioned at lattice points of a hexagonal close-packed lattice prescribed in a cross section of the multi-core optical amplifying fiber 2, the cross section being orthogonal to an axial direction of the multi-core optical amplifying fiber 2.

The multi-core optical amplifying fiber 2 configured as described above has improved pumping efficiency due to effects of different refractive index interfaces at the different refractive index regions 1*da*, similarly to the multi-core optical amplifying fiber 1. Furthermore, adjusting the positions and rotational symmetry of the different refractive index regions 1*da* enables adjustment of the effects of the different refractive index interfaces. For example, the rotational symmetry may be two-fold rotational symmetry or three-fold rotational symmetry.

The different refractive index regions 1*da* may be positioned inside, or on the same perimeter of, the regular hexagon formed by the core portions 1*a*.

The multi-core optical amplifying fiber 2 may be manu-factured by use of a known method of manufacturing a multi-core fiber. For example, a case where the drilling method is used will be described by reference to FIG. 3.

Figure 3:
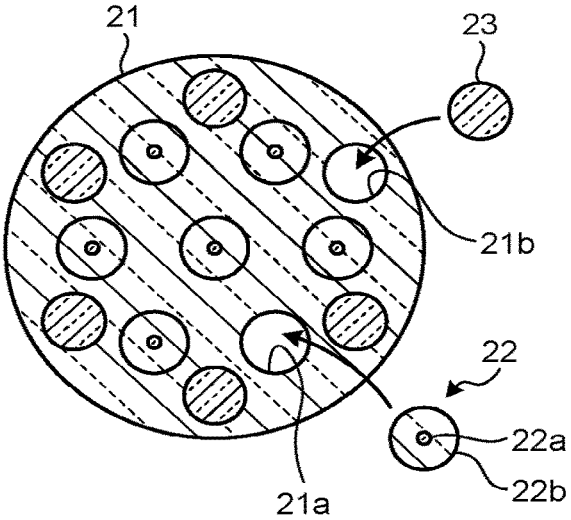
FIG. 3 is a diagram for explanation of an example of a method of manufacturing the multi-core optical amplifying fiber according to the second embodiment.

Specifically, as illustrated in FIG. 3, seven holes 21*a* and six holes 21*b* both extending parallel to the axial direction are formed in a preform rod 21 that becomes part of the inner cladding portion 1*d*. Core rods 22 are inserted in the holes 21*a*, glass rods 23 that become the different refractive index regions 1*da* are inserted in the holes 21*b*, and a preform is thereby formed. The core rods 22 are each a glass rod including: a core portion 22*a* that becomes the core portion 1*a*; and a cladding portion 22*b* that surrounds the core portions 22*a* and becomes part of the inner cladding portion 1*d*. Subsequently, this preform is drawn and the outer cladding portion 1*c* is then formed.

Third Embodiment

Figure 4:
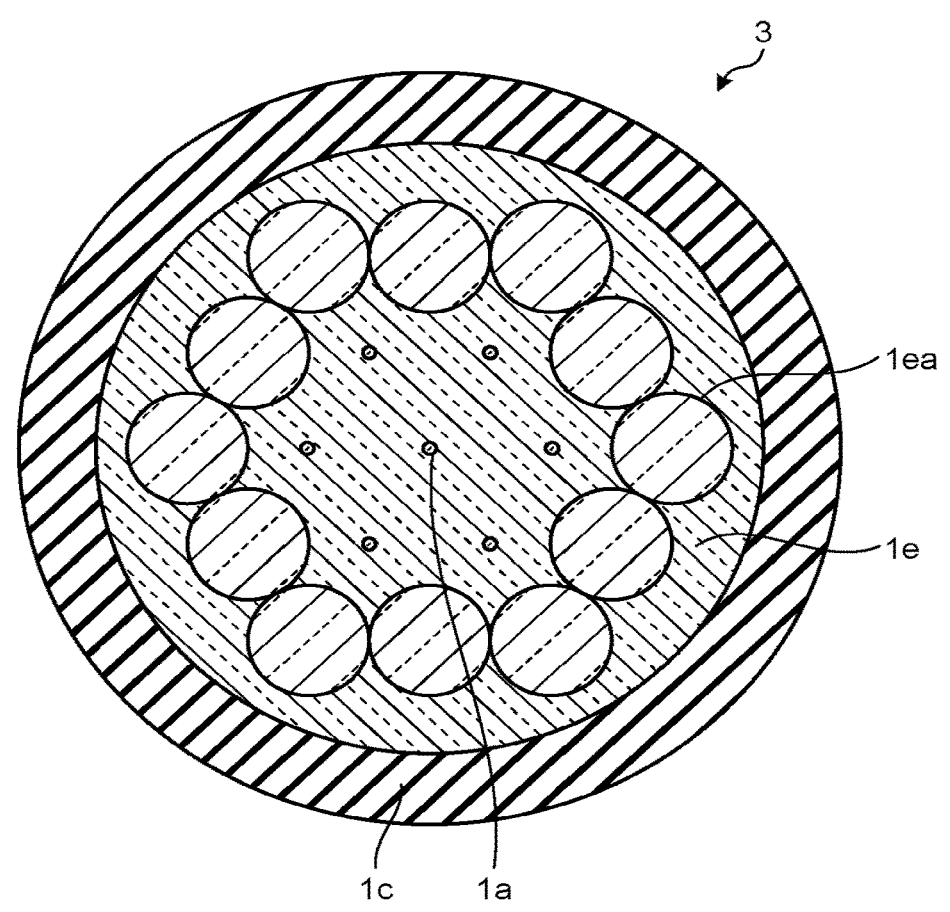
FIG. 4 is a schematic sectional view of a multi-core optical amplifying fiber according to a third embodiment.

FIG. 4 is a schematic sectional view of a multi-core optical amplifying fiber according to a third embodiment. This multi-core optical amplifying fiber 3 has a configura-tion having an inner cladding portion 1*e* instead of the inner cladding portion 1*d*, in the multi-core optical amplifying fiber 2 according to the second embodiment illustrated in FIG. 2. The inner cladding portion 1*e* has a configuration including plural different refractive index regions 1*ea* instead of the different refractive index regions 1*da* in the inner cladding portion 1*d*, the different refractive index regions 1*ea* each having a circular cross section. In this third embodi-ment, the number of the different refractive index regions 1*ea* is twelve but the number is not particularly limited.

The different refractive index regions 1*ea* are positioned outside the regular hexagon formed by the core portions 1*a*. Furthermore, the different refractive index regions 1*ea* are positioned to be rotationally symmetric about an axis at the center of the multi-core optical amplifying fiber 3, and in this third embodiment, are at six-fold rotationally symmetric positions. In addition, the different refractive index regions 1*ea* are positioned at lattice points of a hexagonal close-packed lattice prescribed in a cross section of the multi-core optical amplifying fiber 3, the cross section being orthogonal to an axial direction of the multi-core optical amplifying fiber 3. Furthermore, in this third embodiment, the core portions 1*a* and the different refractive index regions 1*ea* are positioned at lattice points of the same hexagonal close-packed lattice.

The multi-core optical amplifying fiber 3 configured as described above has improved pumping efficiency due to effects of different refractive index interfaces at the different refractive index regions 1*ea*, similarly to the multi-core optical amplifying fibers 1 and 2. Furthermore, adjusting the positions, the number, and the rotational symmetry of the different refractive index regions 1*ea* enables adjustment of the effects of the different refractive index interfaces.

The different refractive index interfaces may be posi-tioned inside, or on the same perimeter of, the regular hexagon formed by the core portions 1*a*. Furthermore, the number of different refractive index regions 1*ea* may be increased or decreased from twelve, as appropriate.

The multi-core optical amplifying fiber 3 may be manu-factured by use of a known method of manufacturing a multi-core fiber. For example, a case where the stacking method is used will be described by reference to FIG. 5.

Figure 5:
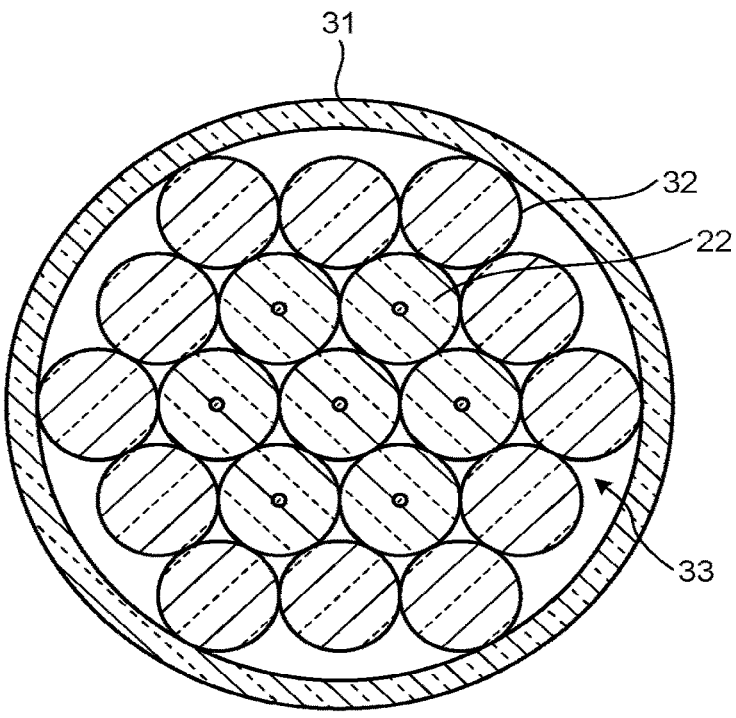
FIG. 5 is a diagram for explanation of an example of a method of manufacturing the multi-core optical amplifying fiber according to the third embodiment.

Specifically, as illustrated in FIG. 5, seven core rods 22 are stacked in a glass tube 31 that becomes part of the inner cladding portion 1*e*. Twelve glass rods 32 that become the different refractive index regions 1*ea* are also stacked in a space 33 between the core rods 22 and the glass tube 31, and a preform is thereby formed. Making the diameter of the core rods 22 and the diameter of the glass rods 32 equal to each other enables formation of a structure having both the core portions 1*a* and the different refractive index regions 1*ea* positioned at lattice points of the same hexagonal close-packed lattice. Furthermore, glass rods that become part of the inner cladding portion 1*e* are also stacked in the remain-ing part of the space 33, the glass rods being made of the same material as the cladding portion 22*b*. Subsequently, this preform is drawn and the outer cladding portion 1*c* is then formed. For reduction of the number of the different refractive index regions 1*ea* from twelve, one or more of the twelve glass rods 32 may be replaced with a glass rod or glass rods made of the same material as the cladding portion 22*b*.

Fourth Embodiment

Figure 6:
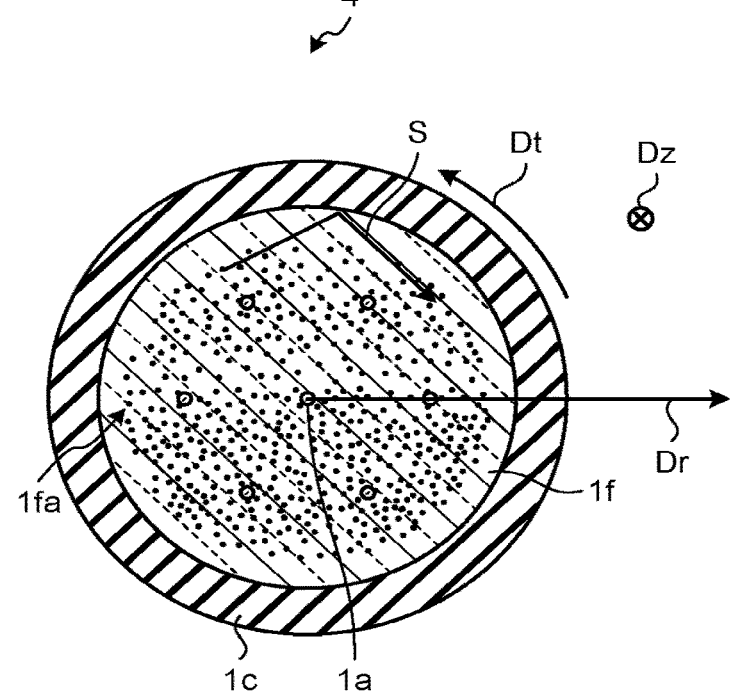
FIG. 6 is a schematic sectional view of a multi-core optical amplifying fiber according to a fourth embodiment.

FIG. 6 is a schematic sectional view of a multi-core optical amplifying fiber according to a fourth embodiment. In FIG. 6, a direction orthogonal to the plane of the figure is an axial direction Dz of a multi-core optical amplifying fiber 4. Furthermore, a radial direction Dr and a circumferential direction Dt of the multi-core optical amplifying fiber 4 have been prescribed in FIG. 6. The axial direction Dz, the radial direction Dr, and the circumferential direction Dt can be prescribed also in the other figures, similarly to FIG. 6.

This multi-core optical amplifying fiber 4 has a configu-ration having an inner cladding portion 1*f* instead of the inner cladding portion 1*d*, in the multi-core optical amplifying fiber 2 according to the second embodiment illustrated in FIG. 2. The inner cladding portion 1*f* has a configuration including plural different refractive index regions 1*fa* instead of the different refractive index regions 1*da* in the inner cladding portion 1*d*.

The different refractive index regions 1*fa* are present in a dispersed manner in the inner cladding portion 1*f*. The different refractive index regions 1*fa* are configured to include, for example, a microcrystal or clusters that is/are present in quartz glass in a dispersed manner. The different refractive index regions 1*fa* are made of, for example, an alkali metal, such as Al or Ge. The larger the refractive index differences between the different refractive index regions 1*fa* and a glass material around the different refractive index regions 1*fa*, the more preferable.

The multi-core optical amplifying fiber 4 configured as described above has improved pumping efficiency due to effects of different refractive index interfaces at the different refractive index regions 1*fa*, similarly to the multi-core optical amplifying fibers 1 to 3. Furthermore, adjusting the sizes and density of presence of the different refractive index regions 1*fa* enables adjustment of the effects of the different refractive index interfaces.

Furthermore, the multi-core optical amplifying fiber 4 has no different refractive index regions 1*fa* in a region of the inner cladding portion 1*f*, the region being near the boundary between the inner cladding portion 1*f* and the outer cladding portion 1*c*. Scatter of any skew component S is thereby adjusted adequately, and scattered light is able to be reduced near the boundary between the inner cladding portion 1*f* and the outer cladding portion 1*c*, the scattered light traveling away from the core portions 1*a*.

Where a cross-sectional ratio is defined as a ratio of the total cross-sectional area of the plural different refractive index regions 1*fa* to the cross-sectional area of the inner cladding portion if in the cross section of the multi-core optical amplifying fiber 4, the cross section being illustrated in FIG. 6 and orthogonal to the axial direction Dz; the cross-sectional ratio is, for example, preferably 0.1% or more and 30% or less, and more preferably 1% or more. When the cross-sectional ratio is 0.1% or more, the improvement in pumping efficiency due to the plural different refractive index regions 1*fa* tends to be larger and when the cross-sectional ratio is 1% or more, the improvement in pumping efficiency tends to be even larger. Furthermore, when the cross-sectional ratio is 30% or less, manufacture of the multi-core optical amplifying fiber 4 having desired optical characteristics (such as amplification characteristics) is able to be facilitated. In addition, in a case where the cross-sectional ratio is more than 30%, the scatter of the pumping light is increased too much and propagation loss of the pumping light in the inner cladding portion if may be increased. In this case, improvement in the pumping efficiency due to scatter of the pumping light by the different refractive index regions 1*fa* may be topped by the degradation in the pumping efficiency due to the increase in propagation loss.

Furthermore, the diameter of the different refractive index regions 1*fa* in the cross section illustrated in FIG. 6 is preferably $\frac{1}{2000}$ of the wavelength of light (pumping light) propagating through the inner cladding portion if or larger and twice that wavelength or smaller. In a case where the diameter of the different refractive index regions 1*fa* that are scatterers is $\frac{1}{20}$ of the wavelength of the pumping light or larger and twice the wavelength or smaller, the scatter of light by the different refractive index regions 1*fa* is mainly Mie scattering. In a case where the diameter of the different refractive index regions 1*fa* is $\frac{1}{2000}$ of the wavelength of the pumping light or larger and $\frac{1}{20}$ of the wavelength or smaller, the scatter of light by the different refractive index regions 1*fa* is mainly Rayleigh scattering. Types of scattering of light waves colliding with particles of a substance or sections where the refractive indices change thus differ depending on those sizes. Mie scattering is mainly forward scattering and Rayleigh scattering is isotropic scattering but both are considered to contribute to improvement in the pumping efficiency. For example, the extent of improvement of the pumping efficiency may be increased by spatial distribution of the different refractive index regions 1*fa* having different diameters according to, for example, the arrangement of the core portions 1*a* and/or the electric field distribution of the pumping light in the inner cladding portion 1*f*, by use of characteristics of scattering directions in these different types of scattering. For example, in a case where largely changing the direction of propagation is more effective, Rayleigh scattering contributes largely to the improvement in the pumping efficiency.

In a case where the cross sections of the different refractive index regions 1*fa* are not circular, the diameters of the different refractive index regions 1*fa* may be defined as the diameters of circles equal to the cross-sectional areas of the different refractive index regions 1*fa*.

The plural different refractive index regions 1*fa* are preferably present randomly in the inner cladding portion if for the pumping light scattering effect to act evenly on the core portions 1*a*. The plural different refractive index regions 1*fa* being present randomly in the inner cladding portion if can be said in other words as the distribution of the different refractive index regions 1*fa* in the inner cladding portion if being balanced and the different refractive index regions 1*fa* being distributed approximately uniformly. Therefore, for example, the different refractive index regions 1*fa* are preferably distributed approximately uniformly in the axial direction Dz.

Figure 7:
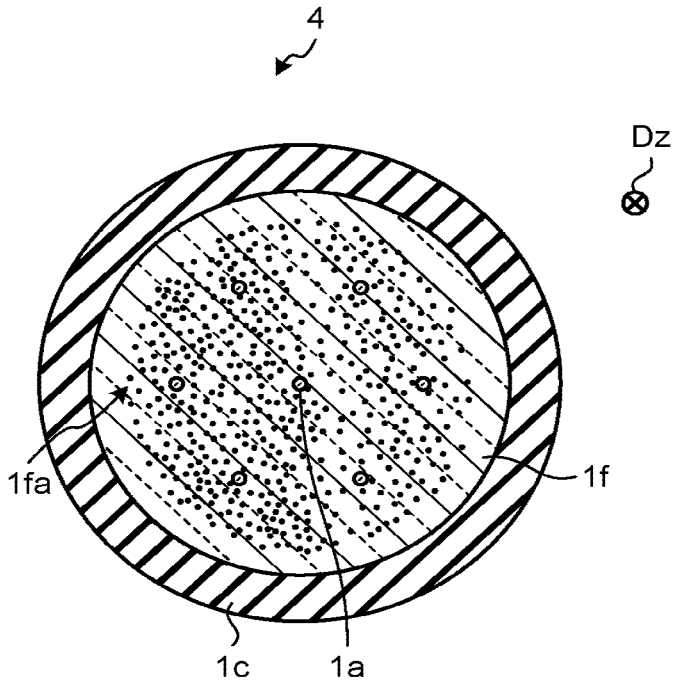
FIG. 7 is a schematic sectional view of the multi-core optical amplifying fiber illustrated in FIG. 6, the schematic sectional view being of a cross section different from that in FIG. 6.

FIG. 7 is a schematic sectional view of the multi-core optical amplifying fiber 4 illustrated in FIG. 6, the schematic sectional view being of a cross section different from that in FIG. 6. The cross section illustrated in FIG. 7 is a cross section at a position that has been moved in the axial direction Dz from the cross section illustrated in FIG. 6 by a distance smaller than the length of the multi-core optical amplifying fiber 4, the distance being, for example, about 1% to about 5% of the length. The different refractive index regions 1*fa* in the cross section illustrated in FIG. 7 are present at positions different from those in the cross section illustrated in FIG. 6, just by the little movement in the axial direction Dz. The positions where the different refractive index regions 1*fa* are present may thus differ from cross section to cross section.

Similarly, for example, the different refractive index regions 1*fa* are preferably distributed approximately uniformly in the radial direction Dr. Furthermore, the different refractive index regions 1*fa* are preferably distributed approximately uniformly in a radial direction of each of the core portions 1*a*. In addition, for example, the different refractive index regions 1*fa* are preferably distributed approximately uniformly in the circumferential direction Dt. In this case, the positions where the different refractive index regions 1*fa* are present in a range of 0 degrees to 60 degrees from a reference angle position along the circumferential direction Dt and the positions where the different refractive index regions 1*fa* are present in a range of 60 degrees to 120 degrees from the reference angle position may be different from each other. Furthermore, the different refractive index regions 1*fa* are preferably distributed approximately uniformly in a circumferential direction of each of the core portions 1*a*.

The multi-core optical amplifying fiber 4 may be manufactured by use of a known method of manufacturing a multi-core fiber. The different refractive index regions 1*fa* may be formed by: addition of the material forming the different refractive index regions 1*fa* to a preform when manufacturing a portion that becomes the inner cladding portion 1*f*; and agglomeration by heat treatment.

Furthermore, in a method of using particles, for example, particles including the different refractive index regions 1*fa* may be used.

Fifth Embodiment

Figure 8:
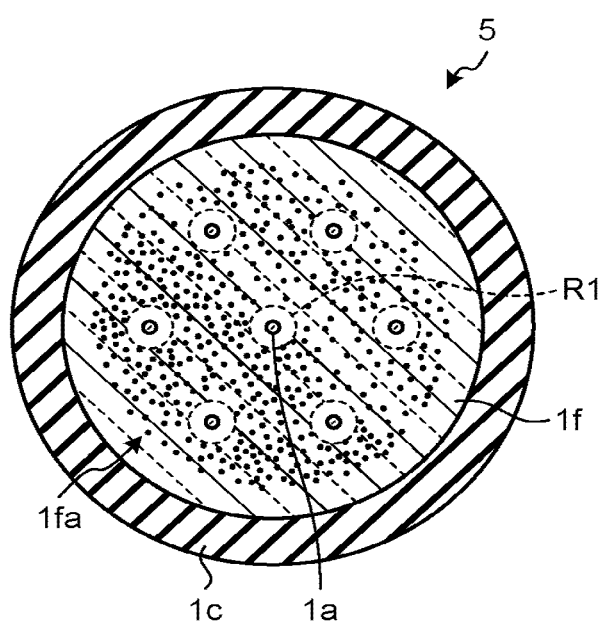
FIG. 8 is a schematic sectional view of a multi-core optical amplifying fiber according to a fifth embodiment.

FIG. 8 is a schematic sectional view of a multi-core optical amplifying fiber according to a fifth embodiment and illustrates a cross section of the multi-core optical amplifying fiber, the cross section being orthogonal to an axial direction of the multi-core optical amplifying fiber. The multi-core optical amplifying fiber 5 is different from the multi-core optical amplifying fiber 4 according to the fourth embodiment in that regions R1 respectively surrounding the core portions 1*a* are present in the inner cladding portion 1*f*.

These regions R1 are regions: respectively concentric with the core portions 1*a*; each having a diameter that is, for example, three times the core diameter of the core portion 1*a* surrounded by that region R1 or larger; extending in the axial direction Dz along the core portions 1*a*; and each being circularly tubular. These regions R1 do not include the different refractive index regions 1*fa*.

The different refractive index regions 1*fa* in the multi-core optical amplifying fiber 5 configured as described above are present at positions respectively separate from the core portions 1a each by a distance equal to or longer than the core diameter, for example, a distance that is three times the core diameter, in a cross section of the multi-core optical amplifying fiber 5, the cross section being orthogonal to the axial direction Dz of the multi-core optical amplifying fiber 5. As a result, the multi-core optical amplifying fiber 5 has improved pumping efficiency, similarly to the multi-core optical amplifying fibers 1 to 4. Furthermore, further scattering of pumping light by the different refractive index regions 1fa near the core portions 1a is able to minimized, the pumping light having been scattered by the different refractive index regions 1fa once and having headed to the core portions 1a. In addition, because the different refractive index regions 1fa are comparatively separate from the core portions 1a, influence of the different refractive index regions 1fa on light propagation characteristics of the core portions 1a is able to be reduced.

The multi-core optical amplifying fiber 5 may be manufactured by use of a known method of manufacturing a multi-core fiber. For example, in a case where the stacking method is used, seven core rods that are glass rods each including a portion that becomes the core portion 1a and a portion that becomes the region R1 are stacked in a glass tube that becomes part of the inner cladding portion 1f. Subsequently, glass rods that include the different refractive index regions 1fa and become part of the inner cladding portion if are stacked in a space between the core rods and the glass tube, and a preform is thereby formed. Subsequently, this preform is drawn and the outer cladding portion 1c is then formed. In a case where the drilling method is used, seven holes extending parallel to the axial direction are formed in a preform rod that is a glass rod that: becomes part of the inner cladding portion 1f; includes the different refractive index regions 1fa; and has a comparatively large diameter. Core rods are then respectively inserted in these holes, and a preform is thereby formed. Subsequently, this preform is drawn and the outer cladding portion 1c is then formed. The different refractive index regions 1fa may be not formed in the glass rod initially, and may be formed, for example, by agglomeration of a dopant through heat treatment in the manufacturing process.

Sixth Embodiment

Figure 9:
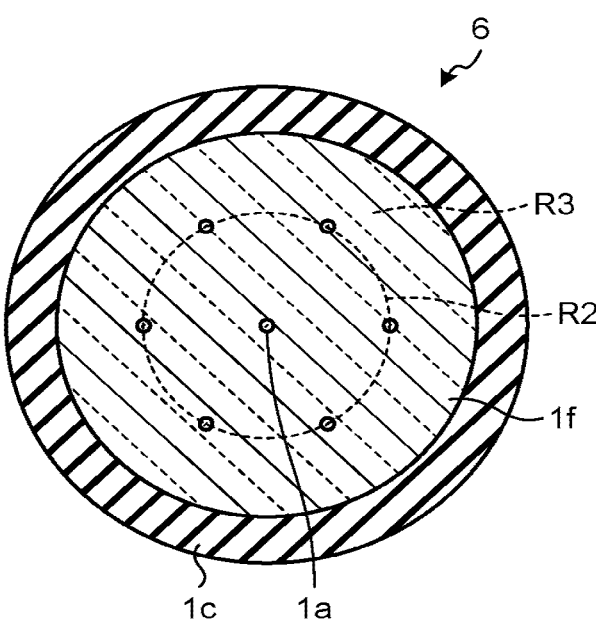
FIG. 9 is a schematic sectional view of a multi-core optical amplifying fiber according to a sixth embodiment.

FIG. 9 is a schematic sectional view of a multi-core optical amplifying fiber according to a sixth embodiment and illustrates a cross section of the multi-core optical amplifying fiber, the cross section being orthogonal to an axial direction of the multi-core optical amplifying fiber. A multi-core optical amplifying fiber 6 is different from the multi-core optical amplifying fiber 4 according to the fourth embodiment in that regions R2 and R3 are present in the inner cladding portion 1f. In FIG. 9, illustration of different refractive index regions has been omitted.

The region R2 is a cylindrical region passing through the centers of six core portions 1a positioned at vertices of a regular hexagon in the inner cladding portion 1f, the cylindrical region extending in the axial direction Dz. The region R3 is a circularly tubular region positioned outside the region R2 in the inner cladding portion 1f, the circularly tubular region extending in the axial direction Dz. The boundary between the region R2 and the region R3 is an example of a circularly tubular boundary passing through the core portion 1a that is the most separate from the center of the multi-core optical amplifying fiber 6. The axis of this boundary is at the center of the multi-core optical amplifying fiber 6.

The region R2 inside the boundary and the region R3 outside the boundary, in the multi-core optical amplifying fiber 6, have different densities of presence of different refractive index regions. For example, the density of presence of different refractive index regions in the region R2 is higher than the density of presence of different refractive index regions in the region R3. Or, for example, the density of presence of different refractive index regions in the region R2 is lower than the density of presence of different refractive index regions in the region R3.

The multi-core optical amplifying fiber 6 configured as described above has improved pumping efficiency, similarly to the multi-core optical amplifying fibers 1 to 5. Furthermore, the multi-core optical amplifying fiber 6 enables extents of generation of scattered light to be different between the region R2 where the core portions 1a are mainly present and the region R3 where skew components are comparatively abundant near the circumference of the inner cladding portion 1f. For example, a lot of scatter may be caused in the region R2 where the core portions 1a are mainly present by increase in the density of presence of different refractive index regions in the region R2, or a lot of scatter of skew components may be caused by increase in the density of presence of different refractive index regions in the region R3. The densities of presence of different refractive index regions in these regions may be designed as appropriate according to the design of and demanded characteristics for the multi-core optical amplifying fiber 6.

The multi-core optical amplifying fiber 6 may be manufactured by use of a known method of manufacturing a multi-core fiber. For example, in a case where the drilling method is used, a preform rod that becomes part of the inner cladding portion if is formed so that different portions of the preform rod have different densities of presence of different refractive index regions. This preform rod may be manufactured by, for example, the jacket method. Subsequently, seven holes extending parallel to the axial direction are formed in the preform rod, core rods are inserted in the holes, and a preform is thereby formed. Subsequently, the preform is drawn and the outer cladding portion 1c is then formed. In a case where the stacking method is used, core rods are stacked in a glass tube that becomes part of the inner cladding portion 1f. Subsequently, glass rods that include different refractive index regions and become part of the inner cladding portion if are stacked in a space between the core rods and the glass tube, and a preform is thereby formed. In forming the preform, using glass rods with different densities of presence of different refractive index regions according to where the glass rods are stacked enables different portions to have different densities of presence of different refractive index regions.

Seventh Embodiment

Figure 10:
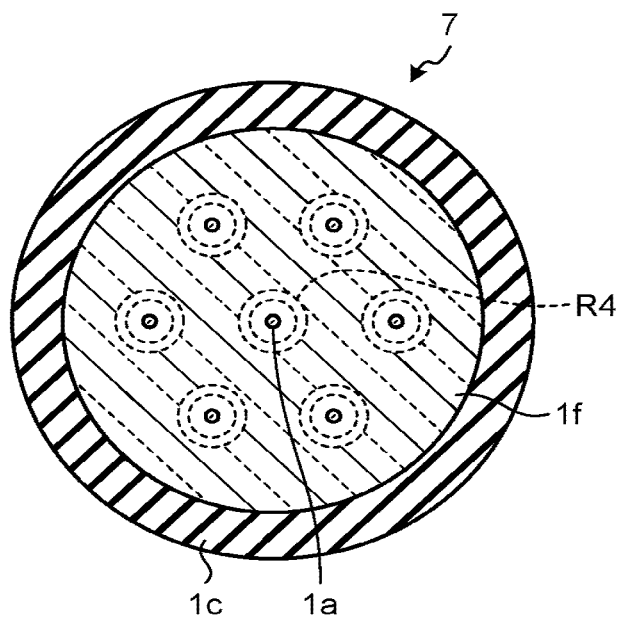
FIG. 10 is a schematic sectional view of a multi-core optical amplifying fiber according to a seventh embodiment.

FIG. 10 is a schematic sectional view of a multi-core optical amplifying fiber according to a seventh embodiment and illustrates a cross section of the multi-core optical amplifying fiber, the cross section being orthogonal to an axial direction of the multi-core optical amplifying fiber. A multi-core optical amplifying fiber 7 is different from the multi-core optical amplifying fiber 4 according to the fourth embodiment in that regions R4 are present in the inner cladding portion if and different refractive index regions are present only in these regions R4. In FIG. 10, illustration of the different refractive index regions has been omitted.

The regions R4 are circularly tubular regions respectively concentric with the core portions 1a and extending in the axial direction Dz along the core portions 1a. The regions R4 may each be present in an annular region separate from the core portion 1a by a distance equal to or larger than the core diameter, in a cross section of the multi-core optical amplifying fiber 7, the cross section being orthogonal to the axial direction Dz of the multi-core optical amplifying fiber 7. Furthermore, in a case where a hexagonal close-packed lattice having lattice points at the core portions 1a is prescribed in a cross section of the multi-core optical amplifying fiber 7, the cross section being orthogonal to the axial direction of the multi-core optical amplifying fiber 7, the different refractive index regions can be said to be each present in an annular shape around a center at one of the lattice points, the annular shape having a radius that is half the distance between lattice points or smaller. The distance between lattice points is the distance between the centers of adjacent ones of the core portions 1a.

The multi-core optical amplifying fiber 7 configured as described above has improved pumping efficiency, similarly to the multi-core optical amplifying fibers 1 to 6. Furthermore, the multi-core optical amplifying fiber 7 enables reduction of scatter of the pumping light happening again, and reduction of influence of the different refractive index regions on the light propagation characteristics of the core portions 1a. In addition, making the densities of presence of different refractive index regions in the regions R4 around the core portions 1a different from one another enables adjustment of the effects of the different refractive index regions on the core portions 1a so that the effects become different from one another.

The multi-core optical amplifying fiber 7 may be manufactured by use of a known method of manufacturing a multi-core fiber. For example, in a case where the drilling method is used, seven holes extending parallel to the axial direction are formed in a preform rod, core rods that have been inserted in glass tubes including different refractive index regions are respectively inserted in the holes, and a preform is thereby formed. Subsequently, this preform is drawn and the outer cladding portion 1c is then formed. The glass tubes including the different refractive index regions may be structured so that the different refractive index regions form plural concentric layers, like the different refractive index regions 1bb, 1bc, 1bd, and 1be in FIG. 1. Glass tubes including such different refractive index regions and having a diameter larger than that of the holes where the glass tubes are inserted may be manufactured and the glass tubes may then be stretched thinly into a shape similar to that of the glass tubes and having an outer diameter allowing the stretched glass tubes to be inserted in the holes. Therefore, for example, forming glass tubes each having a large diameter and a multilayer structure first and thereafter stretching the glass tubes enable a multilayer and fine refractive index profile to be obtained easily.

An ordinary multi-core optical amplifying fiber not including different refractive index regions has a cladding absorption rate of about 0.02 dB/m in a case where a double-cladding multi-core EDF is used as the multi-core optical amplifying fiber, which is configured to optically pump, through the cladding pumping scheme, erbium (Er), a rare earth element, included in the core portions.

In contrast, the multi-core optical amplifying fibers 1 to 7 all have cladding absorption rates of 0.05 dB/m or higher.

A cladding absorption rate is calculated by the following formula.

Cladding absorption rate=−10×log((power of pumping light transmitted through and output from a multi-core optical amplifying fiber (W))/(power of pumping light incident on the inner cladding portion of the multi-core optical amplifying fiber (W)))/length of the multi-core optical amplifying fiber (m).

The wavelength of the pumping light is 976 nm±2 nm.

Eighth Embodiment

Figure 11:
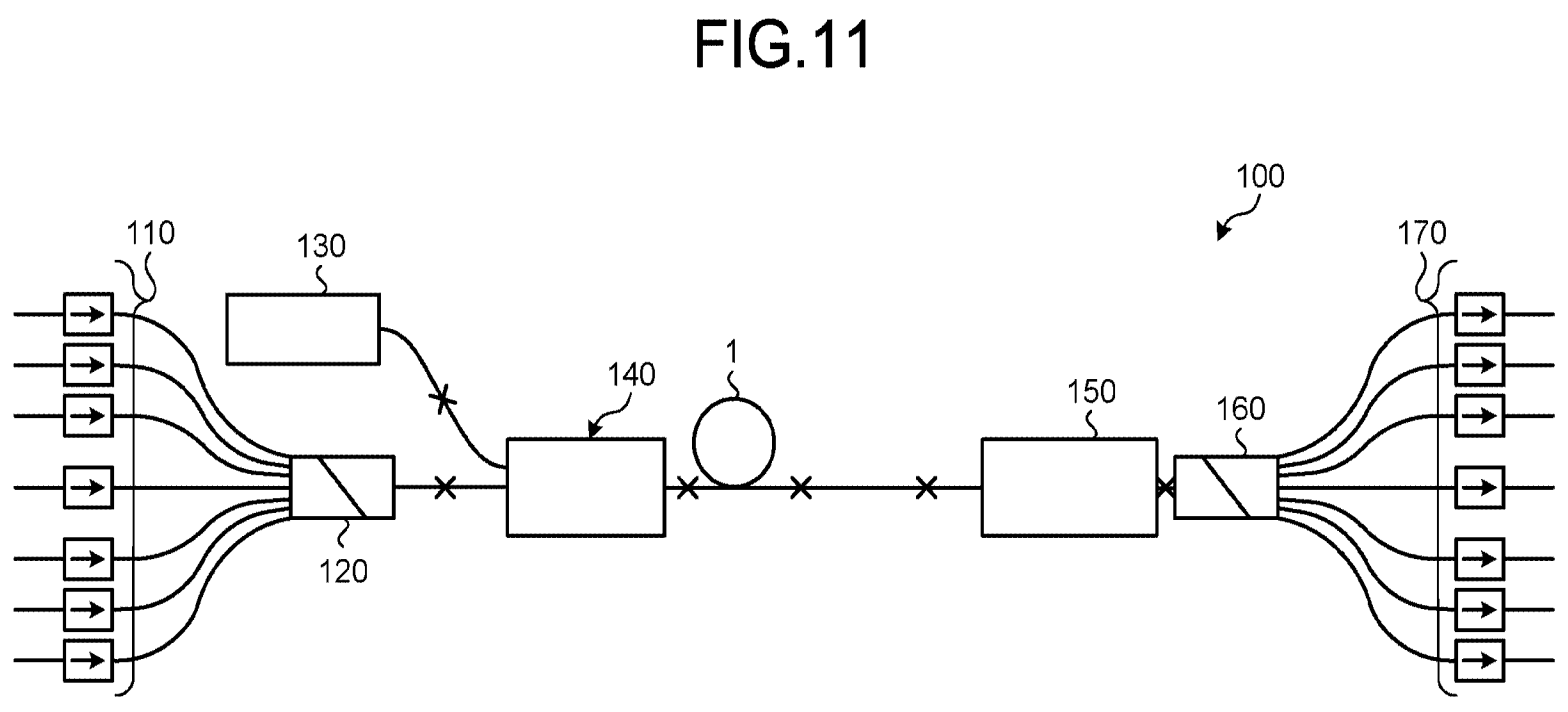

FIG. 11 is a schematic diagram of a configuration of a multi-core optical fiber amplifier according to an eighth embodiment. The multi-core optical fiber amplifier may hereinafter be simply referred to as an optical amplifier. An optical amplifier 100 includes seven optical isolators 110, an optical fiber fan-in 120, a semiconductor laser 130, an optical coupler 140, the multi-core optical amplifying fiber 1 according to the first embodiment, a pump stripper 150, an optical fiber fan-out 160, and seven optical isolators 170. The symbol, "x", in FIG. 11 represents fusion splicing points of optical fibers.

The optical fiber fan-in 120 includes seven single-mode optical fibers that have been bundled together, and one multi-core fiber having seven core portions, and is configured to optically couple core portions of the seven single-mode optical fibers to the core portions of the multi-core fiber at a joint. The seven single-mode optical fibers are standard single-mode optical fibers defined by ITU-TG.652, for example, and respectively have the optical isolators 110 provided therefor. The optical isolators 110 and 170 pass light in directions indicated by arrows in FIG. 11 and block passage of light in the opposite directions. The multi-core fiber of the optical fiber fan-in 120 is connected to the optical coupler 140. Facets of the bundled seven single-mode optical fibers and a facet of the multi-core fiber that are optically coupled to each other have been processed diagonally to the optical axis for reduction of reflection, but may be orthogonal to the optical axis instead. Instead of the seven optical isolators 110 or the seven optical isolators 170, an optical isolator having plural (seven in this embodiment) single-mode optical fibers integrated together may be used.

The multi-core fiber of the optical fiber fan-in 120 includes, similarly to the multi-core optical amplifying fiber 1, seven core portions arranged in a triangular lattice, and a cladding portion positioned around the core portions and having a refractive index lower than the maximum refractive index of the core portions. When signal light is input to the single-mode optical fibers of the optical fiber fan-in 120, the optical isolators 110 pass the signal light therethrough and the core portions of the multi-core fiber propagate the signal light.

The semiconductor laser 130 that is a pumping light source is a lateral multi-mode semiconductor laser and outputs pumping light. The pumping light has a wavelength of 976 nm that is approximately the same as the wavelength of the absorption peak of Er in the 900 nm wavelength band. The pumping light is thereby able to optically pump erbium ions. The semiconductor laser 130 outputs the pumping light from a multi-mode optical fiber. This multi-mode optical fiber is a step-index optical fiber with a core diameter/cladding diameter ratio of, for example, 105 μm/125 μm, and has an NA of, for example, 0.16 or 0.22.

The optical coupler 140 includes a main optical fiber and a pumping light supplying optical fiber. The main optical fiber is a double-cladding optical fiber including: seven core portions arranged in a triangular lattice, similarly to the core portions of the multi-core fiber of the optical fiber fan-in 120; an inner cladding portion positioned around the core portions and having a refractive index lower than the maximum refractive index of the core portions; and an outer cladding portion positioned around the inner cladding portion and having a refractive index lower than that of the inner cladding portion. The core portions and the inner cladding portion are made of silica-based glass and the outer cladding portion is made of resin.

The pumping light supplying optical fiber is a multi-mode optical fiber that is of the same type as the multi-mode optical fiber of the semiconductor laser 130 and that has the other end connected to the multi-mode optical fiber of the semiconductor laser 130, is a step-index optical fiber with a core diameter/cladding diameter ratio of, for example, 105 μm/125 μm, and has an NA of, for example, 0.16 or 0.22. The pumping light supplying optical fiber receives the pumping light from the semiconductor laser 130 and supplies this pumping light to the main optical fiber. The inner cladding portion propagates the pumping light.

One end of the main optical fiber of the optical coupler 140 is connected to the multi-core fiber of the optical fiber fan-in 120. The core portions of the multi-core fiber are connected respectively to the core portions of the main optical fiber. Therefore, when the signal light that has propagated through the core portions of the multi-core fiber is input to the main optical fiber, the signal light is optically coupled to the core portions of the main optical fiber. The core portions of the main optical fiber propagate the signal light. The pumping light and signal light are output from the main optical fiber to the multi-core optical amplifying fiber 1.

One end of the multi-core optical amplifying fiber 1 is connected to the main optical fiber of the optical coupler 140. The core portions 1a of the multi-core optical amplifying fiber 1 are respectively connected to the core portions of the main optical fiber. The inner cladding portion 1b of the multi-core optical amplifying fiber 1 is connected to the inner cladding portion of the main optical fiber. Therefore, as the signal light and pumping light that have propagated through the main optical fiber are input to the multi-core optical amplifying fiber 1, the signal light and pumping light are respectively propagated through the core portions 1a and the inner cladding portion 1b in the same direction. The pumping light optically pumps Er in the core portions 1a while propagating through the inner cladding portion 1b. The signal light propagating through the core portions 1a is optically amplified due to the stimulated emission by Er. The multi-core optical amplifying fiber 1 outputs the signal light that has been optically amplified and pumping light that has not contributed to the optical amplification.

The pump stripper 150 is a known device that eliminates the pumping light that has not contributed to the optical amplification. The pump stripper 150 has a configuration of, for example, a double-cladding multi-core fiber having seven cores, an inner cladding portion, and an outer cladding. A portion of the outer cladding has been removed, the pumping light is taken out from a surface of part of the inner cladding portion, the part corresponding to the portion that has been removed, a radiator plate is irradiated with the pumping light taken out, the pumping light is absorbed by the radiator plate, and energy of the pumping light is thereby converted to heat energy and radiated. In the pump stripper 150, the signal light is propagated by the multi-core fiber and the power of the pumping light is reduced to power enabling the pumping light to be output from the optical amplifier 100 unproblematically.

The optical fiber fan-out 160 includes, similarly to the optical fiber fan-in 120, seven single-mode optical fibers that have been bundled together and one multi-core fiber having seven core portions, and is configured to optically couple core portions of the seven single-mode optical fibers to the core portions of the multi-core fiber at a joint. The single-mode optical fibers respectively have the optical isolators 170 provided therefor. The multi-core fiber is connected to the pump stripper 150. Facets of the bundled seven single-mode optical fibers and a facet of the multi-core fiber that are optically coupled to each other have been processed diagonally to the optical axis for reduction of reflection, but may be orthogonal to the optical axis instead.

When the signal light is input to the core portions of the optical fiber fan-out 160 from the core portions of the multi-core fiber of the pump stripper 150, the signal light propagates through the core portions of the single-mode optical fibers and is output through the optical isolators 170.

In this optical amplifier 100, optical amplification is implemented by use of the multi-core optical amplifying fiber 1 having improved pumping efficiency and power consumption of the semiconductor laser 130 is thus able to be reduced, the power consumption achieving the same amplification characteristics. The gain difference between the core portions 1a of the multi-core optical amplifying fiber 1 preferably is 3 dB or less at a wavelength in the amplification band. The gain difference may be adjusted by change of a characteristic of the multi-core optical amplifying fiber 1, for example, its length.

Instead of the multi-core optical amplifying fiber 1, any of the multi-core optical amplifying fibers 2 to 7 may be used in the optical amplifier 100.

Example of Absorption Spectrum of Multi-Core Optical Amplifying Fiber

Figure 12:
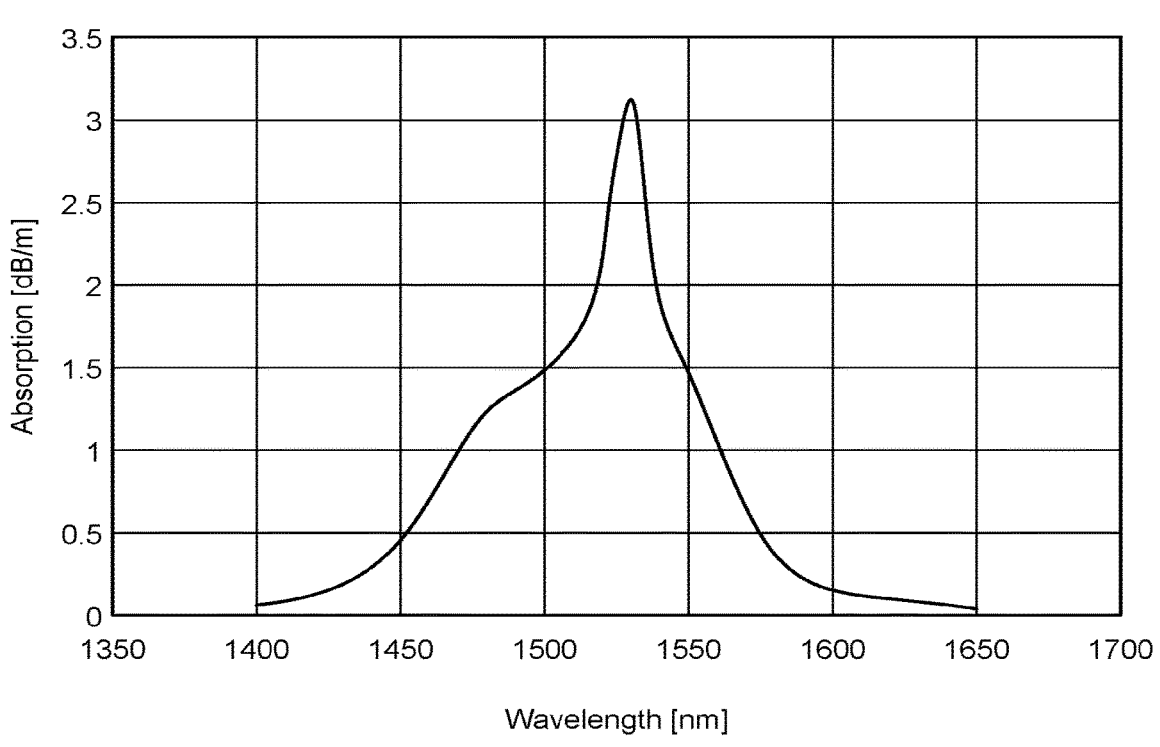
FIG. 12 is a diagram of an example of an absorption spectrum of a multi-core optical amplifying fiber.

FIG. 12 is a diagram of an example of an absorption spectrum of a multi-core optical amplifying fiber and is an absorption spectrum related to a core portion. In the example illustrated in FIG. 12, the absorption peak has a value of about 3.1 dB/m.

Ninth Embodiment

Figure 13:
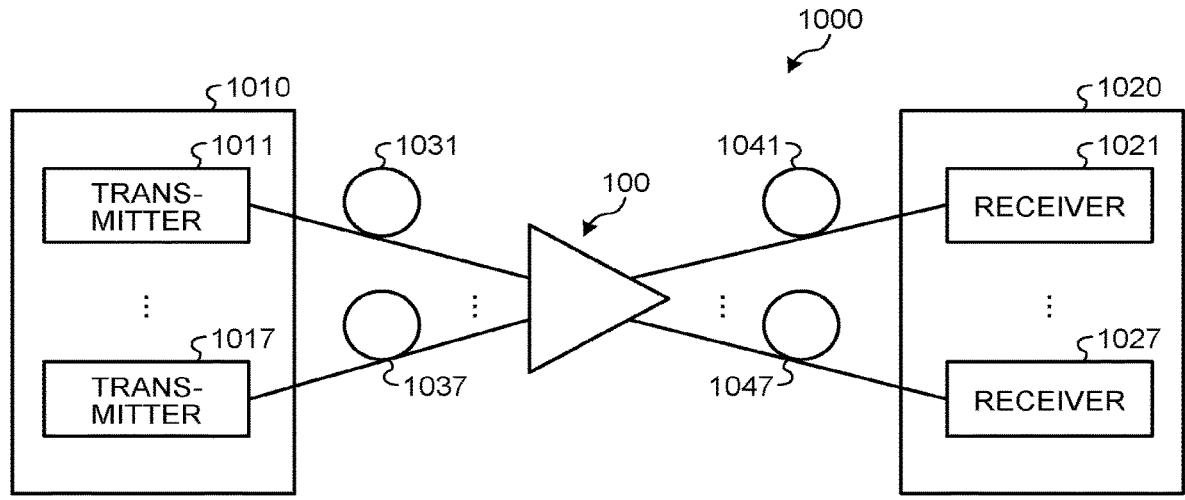
FIG. 13 is a schematic diagram of a configuration of an optical communication system according to a ninth embodiment.

FIG. 13 is a schematic diagram of a configuration of an optical communication system according to a ninth embodiment. An optical communication system 1000 includes an optical transmission device 1010, an optical reception device 1020, the optical amplifier 100 according to the eighth embodiment, and optical transmission fibers 1031 to 1037 and 1041 to 1047 that are 14 single-core optical fibers.

The optical transmission device 1010 includes seven transmitters 1011 to 1017. The transmitters 1011 to 1017 each transmit signal light. The seven optical transmission fibers 1031 to 1037 transmit the signal light output respectively from the transmitters 1011 to 1017 and cause the transmitted signal light to be input to the optical amplifier 100. The optical amplifier 100 optically amplifies the seven beams of signal light input from the optical transmission fibers 1031 to 1037 simultaneously and output them respectively to the seven optical transmission fibers 1041 to 1047. The optical transmission fibers 1041 to 1047 transmit the signal light that has been amplified and cause the transmitted signal light to be input to the optical reception device 1020.

The optical reception device 1020 includes seven receivers 1021 to 1027. The receivers 1021 to 1027 receive the amplified signal light transmitted by the optical transmission fibers 1041 to 1047 and convert the received signal light into electric signals.

The optical amplifier 100 with reduced power consumption for achieving the same amplification characteristics is used in the optical communication system 1000 and optical communication with reduced power consumption is thus able to be implemented. In this embodiment, each set of the seven optical transmission fibers are seven single-core optical fibers, but an optical transmission fiber formed of a single seven-core multi-core fiber may be used instead.

If the optical communication system 1000 is a long-distance communication system, for example, the optical amplifier 100 may be used as a repeater amplifier, a preamplifier, or a booster amplifier. If the optical communication system 1000 is, for example, a network system where a reconfigurable optical add/drop multiplexer (ROADM) is used, the optical amplifier 100 may be used for loss compensation.

In the above described embodiments, the core portions of the multi-core optical amplifying fibers include only Er as a rare earth element, but the core portions may include a rare earth element other than Er. For example, the core portions may include only ytterbium (Yb), or may include both Er and Yb.

Furthermore, in the above described embodiments, the core portions of each of the multi-core optical amplifying fibers are arranged in a triangular lattice, but they may be arranged in a square lattice instead. The number of the core portions in each of the multi-core optical amplifying fibers is not particularly limited as long as the number is plural. In addition, in the above described embodiments, the optical amplifying fibers are multi-core optical amplifying fibers, but the optical amplifying fibers may each be a single-core optical amplifying fiber having only one core portion surrounded by an inner cladding portion.

The disclosure enables provision of an optical amplifying fiber with improved pumping efficiency.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical amplifying fiber, comprising:

a plurality of core portions including a rare earth element added therein;

an inner cladding portion surrounding at least one core portion of the plurality of core portions, the inner cladding portion having a refractive index lower than a maximum refractive index of the at least one core portion; and an outer cladding portion surrounding the inner cladding portion, the outer cladding portion having a refractive index lower than the refractive index of the inner cladding portion, the inner cladding portion including different refractive index regions each having a refractive index different from a refractive index of a region adjacent to that different refractive index region, wherein when a wavelength of pumping light is 976 nm±2 nm, and a cladding absorption rate=−10×log ((power of the pumping light transmitted through and output from the optical amplifying fiber including the plurality of core portions (W))/(power of the pumping light incident on the inner cladding portion of the optical amplifying fiber including the plurality of core portions (W)))/a length of the optical amplifying fiber (m), the cladding absorption rate is 0.05 dB/m or higher.

2. The optical amplifying fiber according to claim 1, wherein the different refractive index regions are made of quartz glass including a dopant for refractive index adjustment, and the dopant is fluorine (F), germanium (Ge), phosphorus (P), boron (B), an alkali metal, chlorine (Cl), or aluminum (Al).

3. The optical amplifying fiber according to claim 1, wherein two or more of layers of the different refractive index regions are present in the inner cladding portion in a radial direction, in a cross section of the optical amplifying fiber, the cross section being orthogonal to an axial direction of the optical amplifying fiber.

4. The optical amplifying fiber according to claim 1, wherein the different refractive index regions are each present at a position separate from the at least one core portion by a distance equal to or longer than a core diameter of the at least one core portion in a cross section of the optical amplifying fiber, the cross section being orthogonal to an axial direction of the optical amplifying fiber.

5. The optical amplifying fiber according to claim 1, wherein the different refractive index regions are at rotationally symmetric positions about an axis at a center of the optical amplifying fiber.

6. The optical amplifying fiber according to claim 1, wherein when a hexagonal close-packed lattice has been prescribed in a cross section of the optical amplifying fiber, the cross section being orthogonal to an axial direction of the optical amplifying fiber, the different refractive index regions are positioned at lattice points of the hexagonal close-packed lattice.

7. The optical amplifying fiber according to claim 1, wherein when a hexagonal close-packed lattice has been prescribed in a cross section of the optical amplifying fiber, the cross section being orthogonal to an axial direction of the optical amplifying fiber, the different refractive index regions are each present in an annular shape around a center at a lattice point of the hexagonal close-packed lattice, the annular shape having a radius that is half a distance between lattice points of the hexagonal close-packed lattice or smaller.

8. The optical amplifying fiber according to claim 1, wherein the different refractive index regions are present in a dispersed manner in the inner cladding portion.

9. The optical amplifying fiber according to claim 8, wherein a total of cross-sectional areas of the different refractive index regions is 0.1% or more and 30% or less of a cross-sectional area of the inner cladding portion, in a cross section of the optical amplifying fiber, the cross section being orthogonal to an axial direction of the optical amplifying fiber.

10. The optical amplifying fiber according to claim 8, wherein the different refractive index regions each have a diameter that is 1/2000 of a wavelength of light that propagates through the inner cladding portion or larger and twice the wavelength or smaller.

11. The optical amplifying fiber according to claim 8, wherein the different refractive index regions are each present in an annular region separate from the at least one core portion by a distance equal to or longer than a core diameter of the at least one core portion in a cross section of the optical amplifying fiber, the cross section being orthogonal to an axial direction of the optical amplifying fiber.

12. The optical amplifying fiber according to claim 8, wherein the different refractive index regions are distributed approximately uniformly in a radial direction of each of the at least one core portion of the optical amplifying fiber.

13. The optical amplifying fiber according to claim 8, wherein the different refractive index regions are distributed approximately uniformly in an axial direction of the optical amplifying fiber.

14. The optical amplifying fiber according to claim 8, wherein the different refractive index regions are distributed approximately uniformly in a circumferential direction of each of the at least one core portion of the optical amplifying fiber.

15. The optical amplifying fiber according to claim 8, wherein the at least one core portion is a plurality of core portions, densities of presence of the different refractive index regions inside and outside a circularly tubular boundary are different from each other, the circularly tubular boundary having an axis at a center of the optical amplifying fiber and passing through a most separate core portion of the plurality of core portions, the most separate core portion being the most separate from the center.

16. The optical amplifying fiber according to claim 1, wherein the rare earth element includes erbium.

17. An optical fiber amplifier, comprising:

the optical amplifying fiber according to claim 1;

a pumping light source configured to output pumping light that optically pumps the rare earth element in the optical amplifying fiber; and an optical coupler configured to optically couple the pumping light to the inner cladding portion of the optical amplifying fiber.

18. The optical fiber amplifier according to claim 17, wherein the at least one core portion is a plurality of core portions, a gain difference between the plurality of core portions is 3 dB or less.

19. An optical communication system, comprising:

the optical fiber amplifier according to claim 18.

\* \* \* \* \*